July 22, 1947.  J. YATES  2,424,425
EGG SHELLER
Filed Jan. 17, 1944
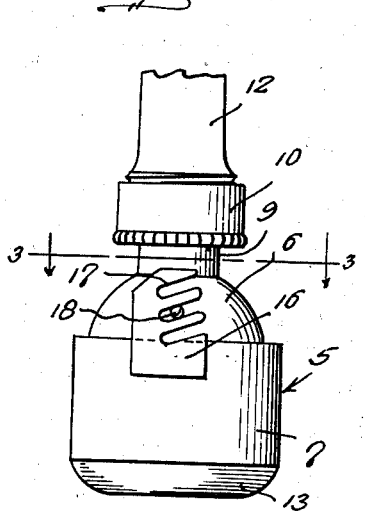
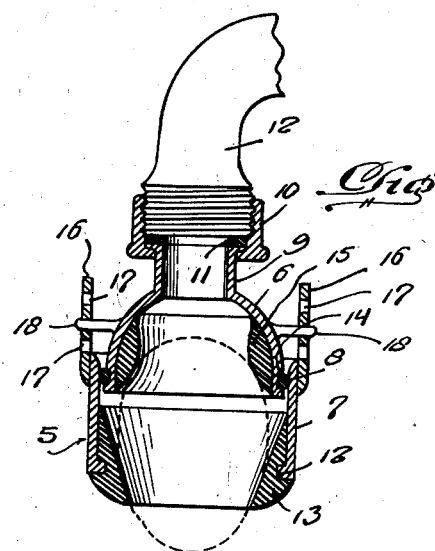
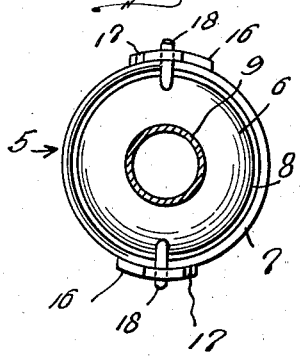
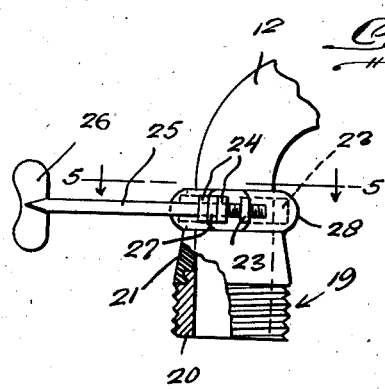
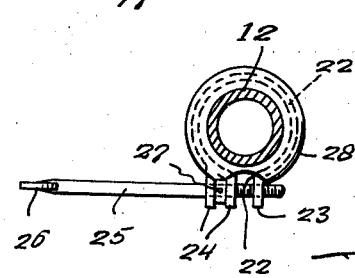
Inventor
Jake Yates,
Attorneys Patented July 22, 1947

2,424,425

UNITED STATES PATENT OFFICE 2,424,425

EGG SHELLER

Jake Yates, Paso Robles, Calif.

Application January 17, 1944, Serial No. 518,577

4 Claims. (Cl. 146—2)

This invention relates to a cooked or hard-boiled egg sheller, and has for the primary object the provision of a device of this character which will efficiently remove in a sanitary manner the shell of an egg after the shell has been cracked or broken, so that the egg will be presented ready for use or eating free of shell particles as well as foreign matter.

Another object of this invention is the provision of a device of the above stated character which may be quickly applied to a faucet of a water pressure system and have a cooked egg, the shell of which has been broken, arranged therein so that the water pressure may be utilized in removing the broken shell and to force the egg from the device free of shell particles and foreign matter, presenting the egg ready for use as a food in a highly sanitary condition.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating an egg sheller constructed in accordance with my invention, and showing the sheller attached to a fragmentary portion of a faucet.

Figure 2 is a vertical sectional view illustrating the device in applied position on the fragmentary portion of the faucet.

Figure 3 is a sectional view taken on the line 3—3 of Figure 1.

Figure 4 is a fragmentary side elevation, partly in section, illustrating an adapter for applying the present invention to a faucet having a non-threaded nozzle.

Figure 5 is a sectional view taken on the line 5—5 of Figure 4.

Referring in detail to the drawing, the numeral 5 indicates as an entirety a device especially adapted for removing the shell from a cooked egg through the use of water pressure received from a faucet of a water system and consists of telescopic sections 6 and 7 provided with a gasket 8 therebetween to act as a seal to prevent water from escaping between the telescopic sections.

The section 6 is of a substantially inverted cup-shape having integral therewith and in communication with the interior thereof a tubular externally and annularly flanged neck 9 equipped with a faucet attaching sleeve 10 internally threaded and provided with an internal annular flange to abut the flange of the neck 9. A gasket 11 engages with the flange of the neck 9 within the sleeve 10 so that when the latter is threaded onto a faucet 12, as shown in Figure 2, the gasket will establish a leakproof connection between the neck and the faucet.

The section 7 is of substantially tubular shape having its upper end slightly tapered or flared internally to facilitate the passing of the section 6 therein along with the gasket 8. The other end of the section 7 is provided with an internal annular flange 12 embedded in a cushion seat or ring 13 which protrudes a limited distance outwardly of the section 7 at the flanged end of said section. The gasket 8 fits tightly within a groove 14 provided in the section 6 to prevent displacement of the gasket during the adjustment of the telescopic sections 6 and 7 relative to each other.

A cushion seat or ring 15 is suitably secured within the section 6 and cooperates with the cushion seat 13 in supporting a cooked egg within the telescopic sections, as shown by dotted lines in Figure 2.

Upstanding ears 16 arranged opposite to each other are formed on the section 7 and are provided with a plurality of slots 17 opening outwardly through an edge thereof. It is preferable that the slots incline upwardly toward their open ends. Pins 18 are secured on the section 6 and may enter any selected slots of the ears for the purpose of adjustably securing the sections 6 and 7 together and whereby the section 7 may be adjusted toward and from the section 6 for the purpose of accommodating in the seats eggs of different sizes.

In operation, the sleeve 10 together with the attached cup 6 is first applied to the faucet and then a cooked egg, which has had the shell thoroughly cracked is arranged within the sections 6 and 7 and the latter connected with each other so that the egg is firmly engaged with the seats. The faucet is then opened so that the water pressure may pass into the section 6 and act on the egg, forcing the egg downwardly through the seat 13 which acts to remove the shell particles from the egg so that on the latter leaving the seat 13 it will be free of shell particles and cleansed of foreign matter ready for eating or other uses.

The cushion seat 13 has a substantially conical shaped opening to engage and to receive the egg so that the egg protrudes a limited distance outwardly of the lower end of the seat 13. The seat 15 also is provided with an opening therethrough, a portion of which is of substantially conical or downwardly flared formation to engage with the egg and cooperates with the seat 13 in supporting the egg prior to the water acting thereon. Thus it will be seen that a device has been provided which may be readily adapted to a faucet so that water pressure may be employed for removing or peeling from the egg the shell which has been previously broken or thoroughly cracked so that on the egg being forced from the device, it will be free of shell particles and other foreign matter.

In order that the present invention may be adapted to a faucet in which the nozzle is non-threaded, a fitting 19 is provided including a threaded section 20 adapted to thread into the sleeve 10 against the gasket 11 and has secured thereto a section 21 constructed of yieldable material such as rubber. The section 21 is adapted to be placed over the non-threaded end or nozzle of the faucet and frictionally engage therewith. Surrounding the section 21 is a split clamp 22 provided with an ear 23 on one end and a pair of ears 24 on the other end thereof. The ear 23 is provided with a screw-threaded opening to receive a threaded stem 25 provided with a finger piece 26. The stem 25 passes freely through openings in the pair of ears 24. A collar 27 is arranged between the pair of ears 24 and is pinned or, obviously, otherwise secured firmly on the stem 25 so that when the stem is rotated in one direction, the split clamp will be caused to contract and tightly secure the section 21 of the fitting 19 on the faucet. The rotation of the stem 25 in a reverse direction, brings about an expansion of the split sleeve so that the section 21 of the fitting 19 may be readily removed or applied to the nozzle of the faucet. A rubber covering 28 is applied to the split clamp to substantially cover the latter.

While I have shown and described the preferred embodiment of my invention, it will be understood that minor changes in construction, combination and arrangement of parts may be made without departing from the spirit and scope of the invention as claimed.

Having thus described my invention, what I claim is:

1. In an egg sheller of the character described, telescopic, hollow, open-ended, complemental sections having cooperatively opposed, aligned and endwise spaced-apart cushion seat rings to receive therebetween a cooked egg the shell of which has been previously broken and with one end of the egg protruding from one of said sections, means detachably connecting the sections endwise together, and means connecting the other section to a faucet of a water or fluid pressure system.

2. In an egg sheller of the character described, telescopic, hollow, open-ended, complemental sections, means for adjustably and detachably connecting said sections endwise together in axial alignment, said sections having meetingly flared, endwise spaced-apart seat rings to receive between them a cooked egg the shell of which has been previously broken and with one end of the egg positioned to protrude through an opening in the outer end of one of said sections, and means for connecting the outer end of the other section to a faucet of a water or fluid pressure system.

3. The herein described egg sheller comprising telescopic, hollow, open-ended, complemental inner and outer sections, the inner section including a fixture at one end for connection thereof to a faucet of a water or fluid supply system under pressure, a gasket provided to fit between the telescopic sections so as to form a leak-proof seal between said sections, means for detachably and adjustably connecting the sections endwise together in annularly overlapped relation, and opposed, meetingly flared, aligned and endwise spaced-apart yieldable seats arranged in said sections to receive a cooked egg the shell of which has been previously broken, and said seats being adapted to support the egg therebetween with one end of the egg protruding beyond one of the seats outwardly of the open end of the outer one of the sections.

4. The herein described egg sheller comprising telescopic, hollow, open-ended, complemental inner and outer sections, the inner section including a neck at one open end thereof, a rotatable internally threaded sleeve on said neck, said neck and sleeve having cooperative provision for holding them against endwise separation but permitting rotation of the one upon the other, means for adjustably and detachably connecting the meeting end portions of the sections together, the necked section being of inverted cup-shape and the other section being of substantially cylindrical shape, and axially aligned and endwise spaced-apart annular cushion seats arranged in the sections to support a cooked egg between them the shell of which egg has been previously broken, and one end of the egg protruding outwardly beyond the seat and outwardly of the open end of the outer one of said sections.

JAKE YATES.

REFERENCES CITED

The following references are of record in the file of this patent:

UNITED STATES PATENTS

| Number | Name | Date |
| --- | --- | --- |
| 1,618,682 | Snapp | Feb. 22, 1927 |
| 433,710 | Aims, Jr. | Aug. 5, 1890 |
| 1,790,111 | Pike | Jan. 27, 1931 |
| 1,910,152 | Durfey | May 23, 1933 |
| 1,929,190 | Parker | Oct. 3, 1933 |